United States Patent [19]

Kopetzky et al.

[11] Patent Number: 5,730,385
[45] Date of Patent: Mar. 24, 1998

[54] SPRING-DRIVEN REELER FOR SAFETY BELTS

[75] Inventors: Robert Kopetzky, Lonsee; Matthias Pleyer, Senden, both of Germany

[73] Assignee: Takata (Europe) Vehicle Safety Technology GmbH, Ulm, Germany

[21] Appl. No.: 647,370

[22] Filed: May 9, 1996

[30] Foreign Application Priority Data

May 10, 1995 [DE] Germany .................. 195 17 123.3

[51] Int. Cl.⁶ .................. B65H 75/48; B60R 22/44
[52] U.S. Cl. .................................................. 242/375.3
[58] Field of Search .................. 242/375, 375.3; 280/805, 806, 807

[56] References Cited

U.S. PATENT DOCUMENTS

| | | |
|---|---|---|
| 3,997,126 | 12/1976 | Karlsson .................. 242/375.3 |
| 4,036,449 | 7/1977 | Schreiber . |
| 4,084,765 | 4/1978 | Bonnaud .................. 242/375.3 |
| 4,290,564 | 9/1981 | Karlsson .................. 242/375.3 |
| 5,127,671 | 7/1992 | Yano et al. .................. 280/806 |
| 5,409,176 | 4/1995 | Kopetzky .................. 242/375.3 |

FOREIGN PATENT DOCUMENTS

| | | |
|---|---|---|
| 27 36 998 A1 | 3/1979 | Germany . |
| 42 25 073 A1 | 2/1994 | Germany . |
| 2 118 022 A | 10/1983 | United Kingdom .................. 242/375.3 |

*Primary Examiner*—John P. Darling
*Attorney, Agent, or Firm*—Fitch, Even, Tabin & Flannery

[57] ABSTRACT

A spring-driven reeler for safety belts in motor vehicles has a belt reel which is acted on with a winding-up force of defined size via a first conical thread reel, a thread and a second thread reel by means of a spring arrangement. Measures are provided in order to maintain the safety of the belted-up vehicle occupants as far as possible on thread breakage.

18 Claims, 6 Drawing Sheets

SPRING-DRIVEN REELER FOR SAFETY BELTS

FIELD OF THE INVENTION

The invention relates to a spring-driven reeler for safety belts in motor vehicles.

BACKGROUND OF THE INVENTION

With spring-driven belt reelers, the problem exists that the spring tension increases with increasing pull-out of the safety belt so that the retraction force on the safety belt which initially amounts to for example only 2N can increase up to 18N with a fully drawn out belt. The fact that the diameter of the belt band reel on the winding spindle reduces with increasing draw-out of the belt contributes to this strong increase of the retraction force, whereby a larger force is increasingly transmitted to the belt.

In order to overcome this disadvantage, it has already become known from (U.S. Pat. No. 3,997,126; DE-OS 25 53 652; DE-OS 33 13 580; DE-U-75 33 791; EP 0 581 228 A1) to insert a transmission between the belt reeling spindle and the spiral spring which is to be tensioned by rotation of a shaft, with the transmission comprising two draw member reels arranged parallel to one another and aligned sideways with one another. The two draw member reels, which are of oppositely directed conical shape or taper in another manner, are connected in rotationally fixed manner by a draw member wound onto them, in particular a cable, thread or band. By a suitable design of the thread reels a substantially constant retraction force can thus be achieved on pull-out of the safety belt. It is also possible to realise other desired retraction force characteristics by a suitable shaping of the thread reels.

When the draw member breaks with a reeler of this kind, the force which draws in the safety belt is missing so that the safety belt which has been drawn .out to a certain degree persists in the drawn-out position and thus a reliable holding of the belted-up person is under some circumstances no longer ensured.

SUMMARY OF THE INVENTION

The principal object of the present invention is thus to provide a spring-driven reeler of the initially named kind which secures the person making use of the safety belt, at least with a reduced level, even with a draw member breakage.

In order to satisfy this object, the features and the concept underlying the invention is thus to be seen in the fact that at least further drawing out of the safety belt is avoided. However, automatic substitute measures are preferably initiated in order to also enable a drawing-in of the safety belt into the tensioned position. The breakage of the draw member is admittedly extremely improbable, should, however, not or only trivially impair the safety of the belted-up person if it should nevertheless occur once.

Preferred embodiments of the invention include the provision of clutch and transmission means in accordance with the claims 2 to 6 and 18 is in this respect the safest way of reacting to the breakage of the draw member.

Another preferred form is likewise reliable but substantially simpler measure and includes the provision of an auxiliary spring arrangement at the first draw member reel which can be realised with a small degree of cost and complexity. By suitable design of the tapering of the draw member reels it is possible not only to take account of the spring characteristic of the main spring arrangement, but also of that of the auxiliary spring arrangement.

The auxiliary spring arrangement should, however, only make available a certain fraction of the total belt winding force. Preferred ranges include 5 to 40%, and more particularly 30%, of the total winding force.

A substantially simpler measure for taking account of draw member breakage is characterised by only the belt draw-out blocking device being set in operation so that a further drawing-out of the safety belt is made impossible. The safety ensured by this embodiment is, however, restricted because an already achieved degree of draw-out of the safety belt cannot be made retrospective.

In another form, the characteristic of an eventually present belt tensioner which is able to rotate the belt reel in the belt winding direction can be exploited in order, in the event of a draw member breakage, to draw in the safety belt, at least by the amount made possible by the belt tensioner, and subsequently to block it.

The draw member break detector preferably operates so that in the event of thread breakage, the main spring arrangement strongly accelerates the second draw member reel—which is now relieved—so that a draw member break signal can be obtained both from the acceleration and also from the ultimately achieved higher speed of rotation.

Another form likewise includes a measure which is very simple to realise. If one of the two or more partial draw members breaks, the remaining partial draw members can take on its function providing it is correspondingly somewhat over-dimensioned—as should be done in the accordance with the invention.

In another preferred embodiment the fact is likewise exploited that the speed of rotation of the second draw member reel rises greatly on draw member breakage so that this can also be exploited for the closing of a centrifugal clutch and for the transmission of the rotation of the second draw member reel to the belt reel.

BRIEF DESCRIPTION OF THE DRAWINGS

The invention will be described in the following with reference to the drawing in which are shown.

Figure 1:
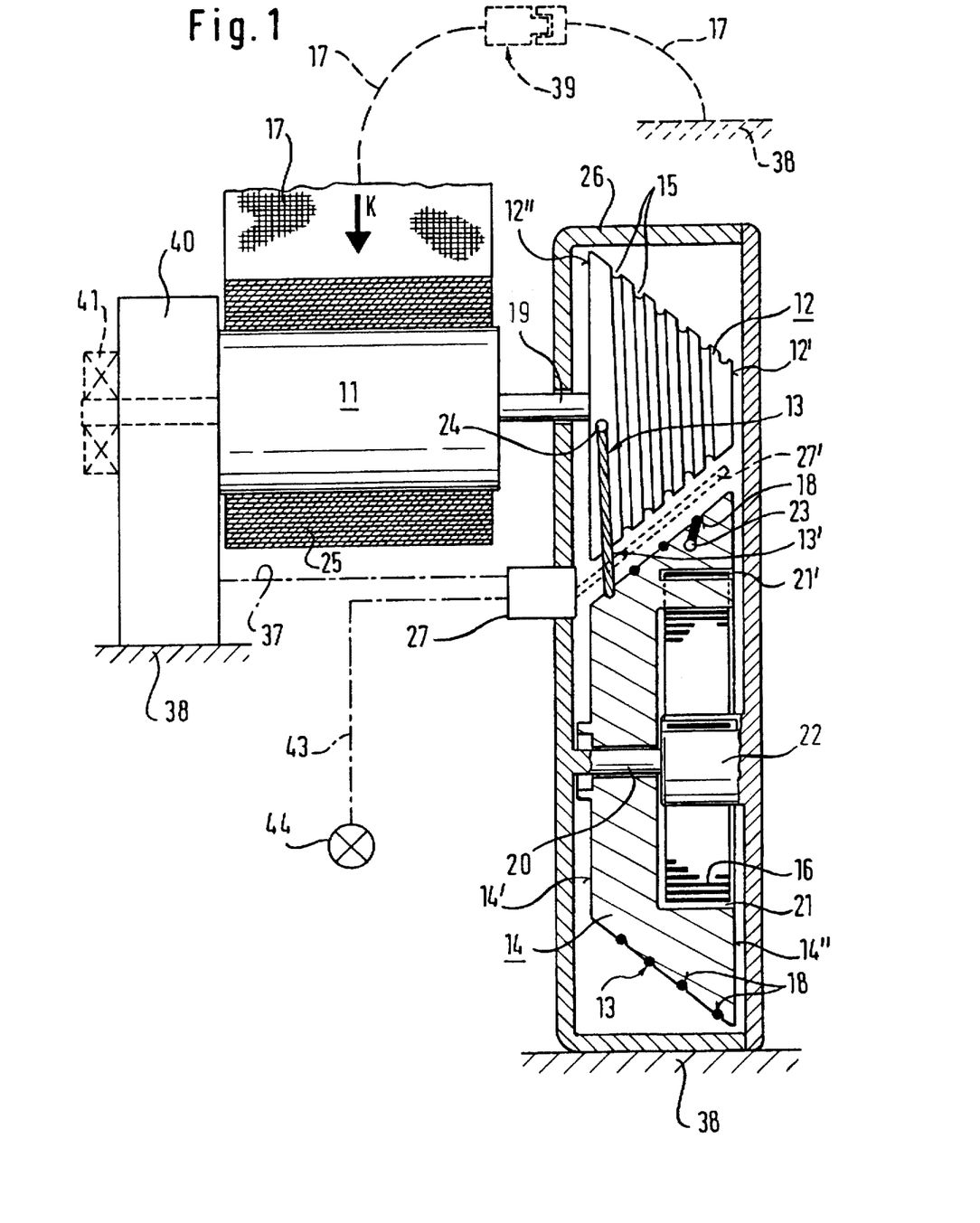
FIG. 1 a partly sectioned view of a spring-driven reeler in accordance with the invention for a safety belt, illustrating a first embodiment of the measures which are to be provided in accordance with the invention on draw member breakage, FIGS. 2–5 corresponding views of further embodiments, FIG. 6 a side view of a transmission arrangement which can be used in place of the belt transmission shown in broken lines in FIGS. 4 and 5, FIG. 7 a view as in FIGS. 1–5 of a further embodiment, and FIG. 8 a perspective illustration showing only the two conical draw member reels with the draw member arranged thereon in a preferred embodiment.

In accordance with FIG. 1 a belt reeler in accordance with the invention has a belt reel 11 onto which a safety belt 17 can be wound of which only a small piece is indicated. The safety belt is guided in the manner illustrated in broken lines via a customary belt lock 39 around the body of a non-illustrated vehicle occupant to the vehicle chassis 38 and is secured there. The invention is however not only usable with two-point belts but also with three-point belts. The belt reel 11 is rotationally journalled at a housing 26 by means of a rotary shaft 19 which is in turn secured to the vehicle chassis 38 at the bottom. At the end of the rotary shaft 19 remote from the belt reel 11 a conically shaped thread reel 12 with a smaller end face 12' and a larger end face 12" is arranged within the housing 26 and is provided at its periphery with a helical guide groove 15. At the end face of the belt reel 11 remote from the thread reel 12, a belt draw-out blocking device 40 is indicated purely schematically which is secured to the vehicle chassis 38 and prevents the further draw-out of the belt 17 in the event of accident-dependent accelerations, and/or in the event of a too sudden pull-out of the safety belt 17. Moreover, at the left end face of the belt reel 11 in FIG. 1, a belt tensioner 41 is schematically illustrated which, on the occurrence of an accident-dependent acceleration in the motor vehicle, winds up the belt reel 11 by a predetermined amount of, for example, 5 to 10 cm, for example through triggering of a pyrotechnical charge, in order to thereby tightly apply the safety belt against the body of a belted-up person. As a result of the belt draw-out blocking device 40, the firmly tightened state of the safety belt 17 is maintained until the accident-dependent acceleration has terminated.

In accordance with FIG. 1, a further thread reel 14 is provided which extends conically in the opposite direction to the first thread reel with its smaller diameter being the same as the larger diameter of the first thread reel 12. The thread reel 14 is arranged alongside the thread reel 12 with its axis parallel to the axle of rotation 19 and is laterally aligned with the thread reel 12. The left-hand large end face 12" and the right-hand small end face 12' of the small thread reel 12 in FIG. 1 lie substantially in respective planes with the left-hand small end face 14' and the right-hand large end face 14" of the large thread reel 14 respectively. The second guide reel 14 also has a helical guide groove 18 at its periphery.

It is rotationally seated on a shaft 20 fixed relative to the housing, the shaft 20 being secured to the housing 26 parallel to and laterally spaced from the shaft 19.

The second thread reel 14 has, in accordance with FIG. 1, a coaxial hollow cavity 21 at the side of its large end face in which a spiral spring arrangement 16 is provided which is secured at one end to a spigot 22 fixed relative to the housing which carries the shaft 20 and at the other end at 21' to the peripheral wall of the hollow cavity 21. The spiral spring arrangement 16 transmits a torque to the thread reel 14 which attempts to wind up a thread 13 laid into its guide groove 18 and secured in accordance with FIGS. 1 and 2 at 23. The thread 13 extends in accordance with FIGS. 1 and 2 as a straight-line element 13' from the narrowest part of the thread reel 14 to the part of the guide groove 15 of the first thread reel 12 aligned therewith, where the thread 13 is secured at 24 to the thread reel 12.

In the winding position which can be seen from FIG. 1, the thread 13 is largely completely wound onto the thread reel 14 and unwound from the first thread reel 12. In this state, the belt coil 25 has the largest diameter on the belt reel 11, i.e. a maximum belt length is now wound up onto the belt reel 11 and the belt 17 is now drawn-in to the furthest extent.

If now the belt 17 is slowly drawn out against the retraction force K in FIG. 1, then the first thread reel 12 rotates in such a direction of rotation that the thread 13 is successively wound onto the first thread reel 12 and successively wound off from the second thread reel 14, with the thread being increasingly laid into the guide groove 15 and removed from the guide groove 18. During this, the main spring arrangement 16 is increasingly tensioned. With a suitable shape of the generatrix of the draw member reels 12, 14, the torque on the second thread reel 14 which increases on tensioning of the spiral spring 16 can be compensated at the belt reel 11. For this the transmission ratio between the spiral spring arrangement 16 and the belt reel 11 changes during winding up of the thread 13 onto the thread reel 12 and on unwinding from the thread reel 14 so that a constant retraction force or a retraction force graduated as desired is available at the safety belt 17. With rapid draw-out of the safety belt 17 the draw-out blocking device 40 engages in the customary manner.

Various measures are provided in accordance with FIG. 1 as follows in order to secure the belted-up person in the event of breakage of the thread 13:

According to FIG. 1, a thread break detector 27 can be provided at the housing 26 which either directly determines the presence or the tension of the thread piece extending between the thread reels 12 and 14 by means of a thread sensor 27', which is only indicated in broken lines. Alternatively, according to FIG. 2, the thread break detector 27 can be provided with speed sensors 27", 27''' which are arranged close to the outer periphery of the small end face 14' of the second thread reel 14 or of the large end face 12" of the first thread reel 12 and permit the detection of the instantaneous speed of the second thread reel 14 relative to the first thread reel 12 by mechanical, electrical, magnetic or optical means.

In the simplest case (FIG. 1) the thread break detector 27 is connected via a control line 37 to the belt draw out blocking device 40. In this way the thread break detector 27 can trigger the belt draw-out blocking device 40 on detection of a breakage of the thread 13 and can in this way prevent a further draw-out of the safety belt 17. This admittedly signifies that under some circumstances looseness present in the safety belt 17 is maintained, in any event, however, a more pronounced loosening of the safety belt 17 due to further drawing out of the belt is reliably avoided.

Figure 2:
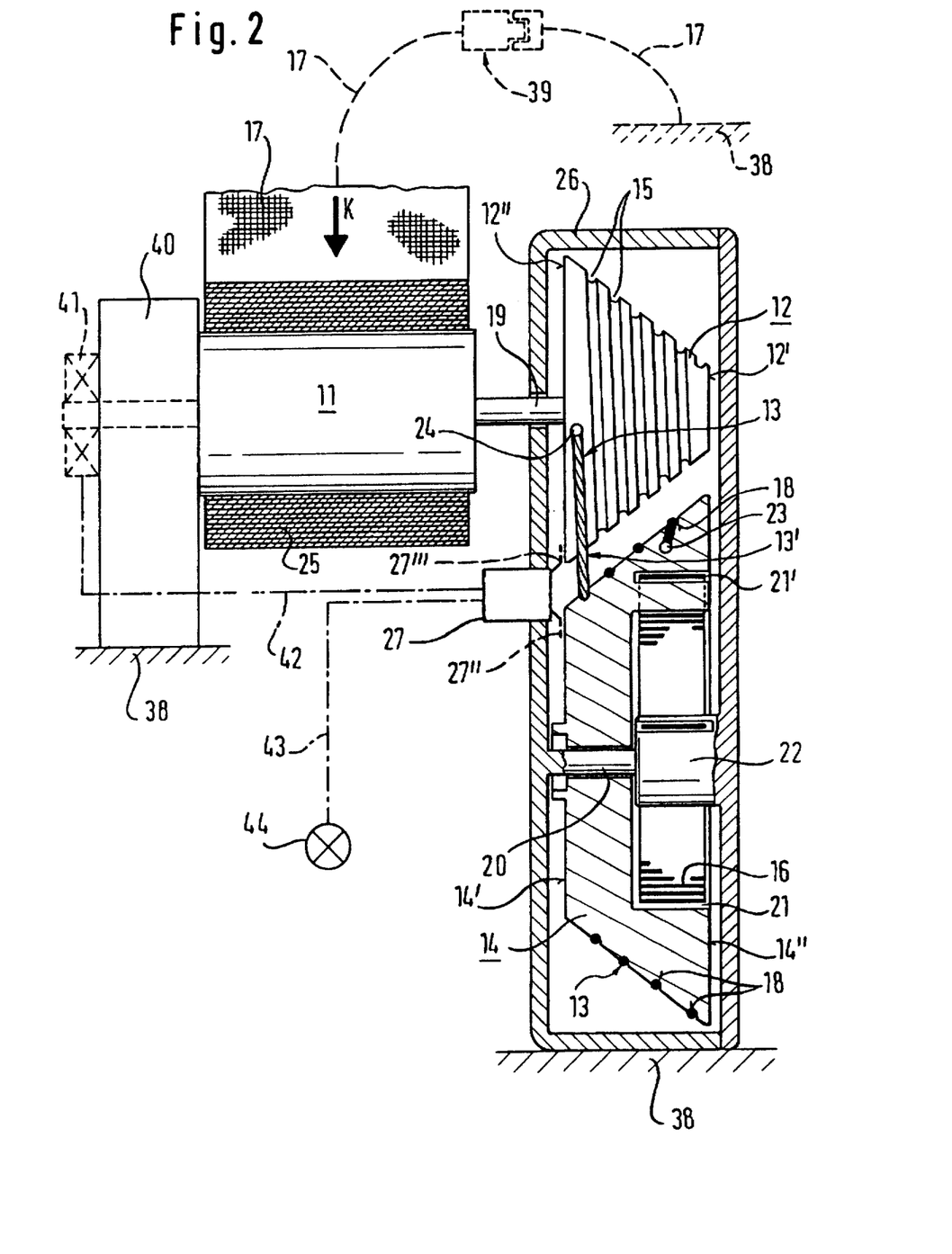

Another possibility of avoiding a further draw-out of the safety belt 17 in the event of a thread break, and indeed of also bringing about a certain tensioning of the safety belt, consists according to FIG. 2 in connecting the thread break detector 27 via a control line 42 to the belt tensioner 41. This is done so that, on detecting a thread break through the thread break detector 27, the belt tensioner, as in the case of an accident, is triggered. The belt tensioner thus tensions the belt by a predetermined amount, with the belt draw-out blocking device 40 subsequently becoming operative and fixing the relevant drawn-in state of the safety belt 17.

In all embodiments, the thread break detector 27 should also be connected via a line 43 to a warning lamp 44 or to an acoustic signal generator which is for example mounted on the dashboard of a vehicle. The driver of the vehicle is thus warned by lighting-up of the warning lamp 44 or sounding of the acoustic warn signal on occurrence of a thread break, and is caused to seek a workshop which can exchange the damaged belt reeler.

Figure 3:
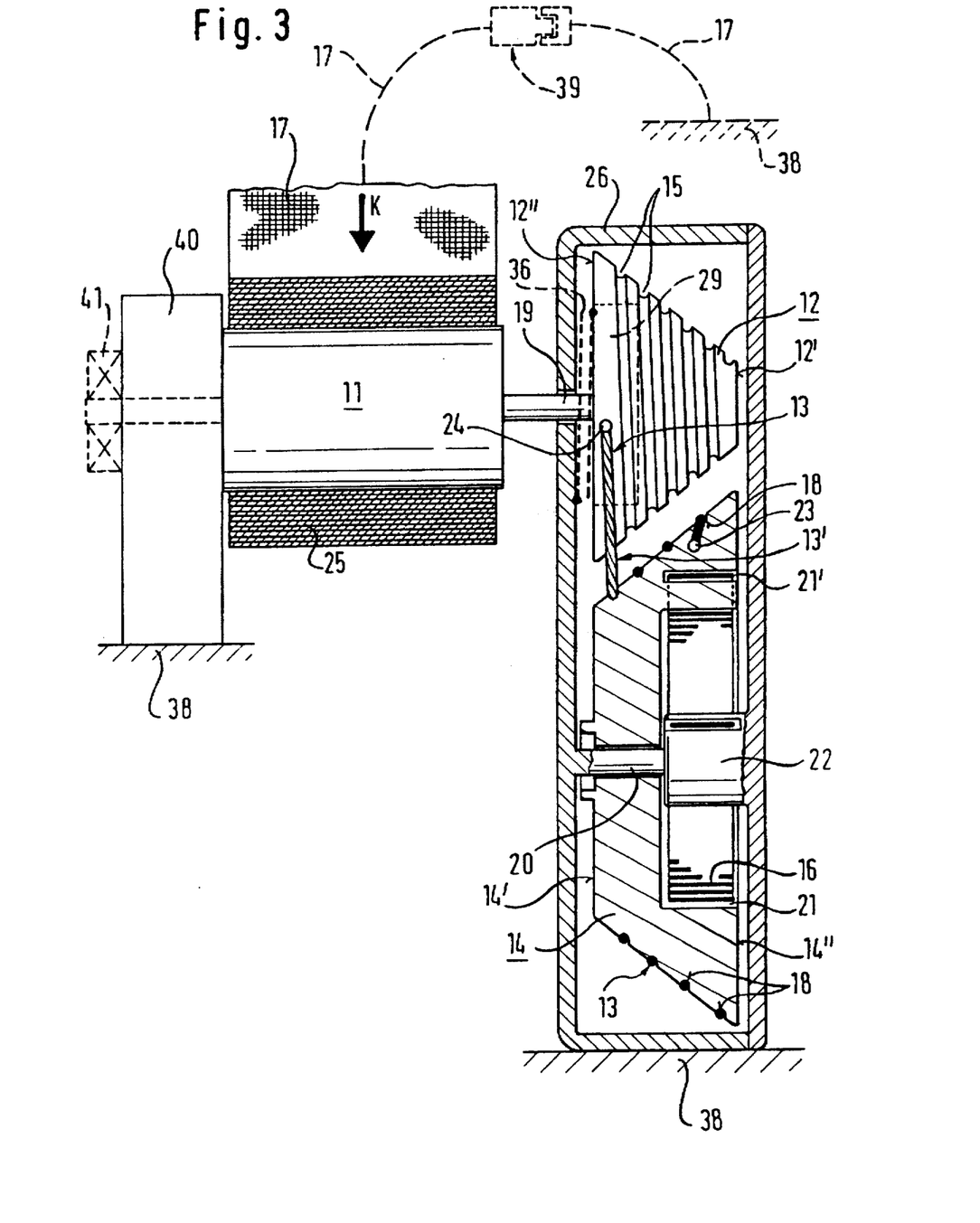

As shown in FIG. 3, a further possibility of achieving the drawing-in of the safety belt 17 even with a breakage of the thread 13 lies in providing an auxiliary spring arrangement 36 indicated in broken lines in FIG. 1 between the first thread reel 12 and the housing 26. This spring 36 exerts a permanent torque on the first thread reel 12 in the direction of winding-up of the safety belt 17 onto the belt reel 11. This torque supplements the torque which is normally exerted by the main spring arrangement 16 via the spring reel 14 and the thread 13 on the first thread reel 12. Accordingly, the main spring arrangement 16 must be made correspondingly weaker.

The auxiliary spring arrangement 36 should make available only about 30% of the torque required for the energization of the belt reel 11, whereas the main spring arrangement 16 should make available about 70% of the torque required for the energization of the belt reel 11.

By a suitable shaping of the generatrices of the thread reels 12 and 14, both the spring characteristic of the main spring arrangement 16 and also the spring characteristic of the auxiliary spring arrangement 36 can be taken into account.

The auxiliary spring arrangement 36 can also be a spiral spring which is preferably arranged in a hollow cavity 29 of the thread reel 12 which is only indicated in broken lines, and indeed in a similar manner to that in which the main spring arrangement 16 is arranged in the hollow cavity 21 of the second thread reel 14.

Figure 4:
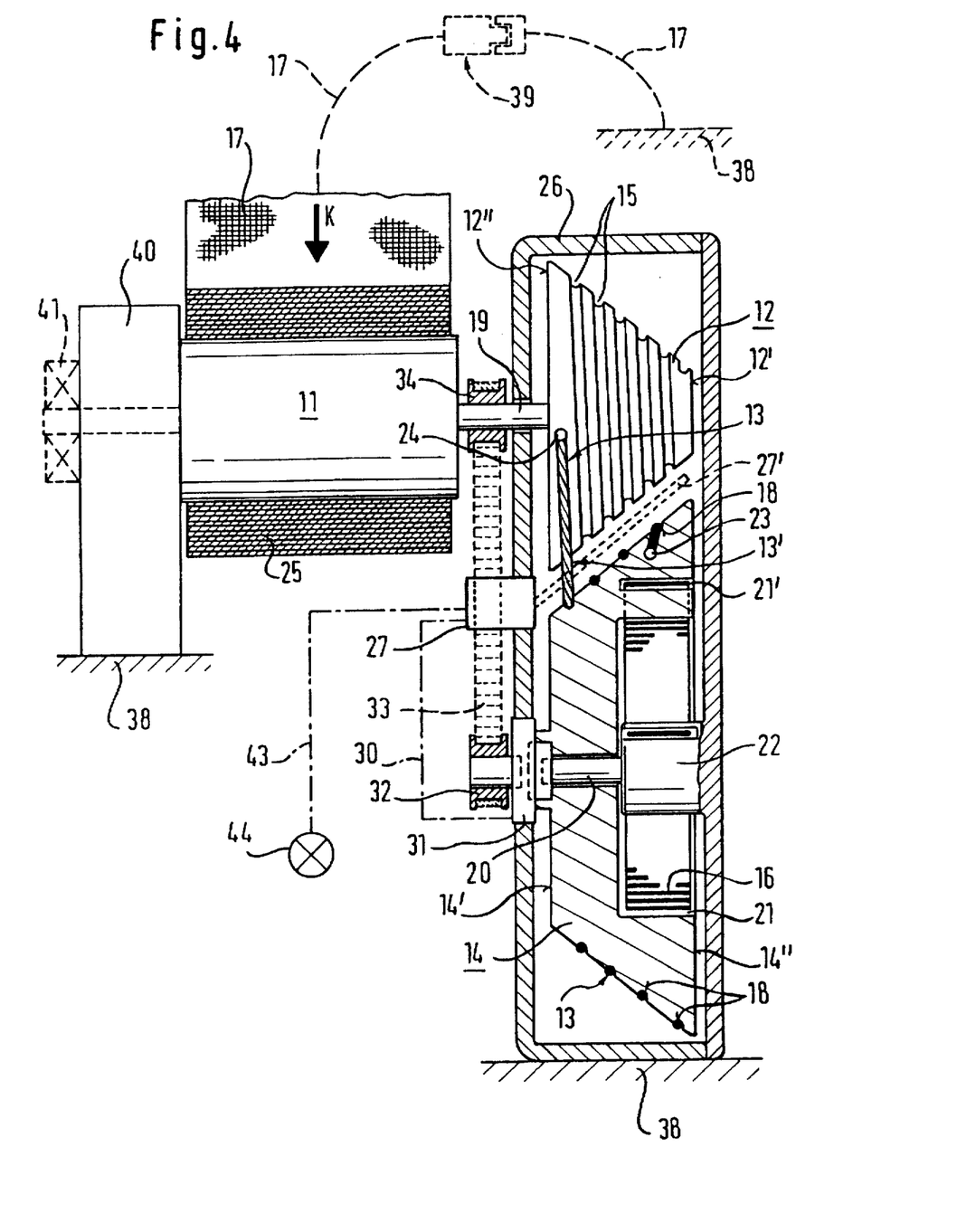

A somewhat more complicated, but particularly effective embodiment according to FIG. 4 provides that the turning of the second thread reel 14 is transmitted to a clutch 31 arranged at the housing 36 which is open in normal operation but which can be engaged by the thread break detector 27 via a control line 30 when a thread break is detected. Then the thread reel 14 transmits its rotary movement via the now engaged clutch 31 to a drive belt pulley 32 provided at its output drive side, the drive belt pulley 32 being connected via a drive belt 33 to a further belt pulley 34 which is rotationally fixedly arranged on the rotary shaft 19 of the belt reel 11 or of the thread reel 12. The rotary movement of the second thread reel 14 is now transmitted via the clutch 31, the drive belt pulley 32, the drive belt 33 and the drive belt pulley 34 to the rotary shaft 19 and thus to the belt reel 11 rather than being transmitted via the broken thread 13. As a result of the constant transmission ratio of the transmission formed by the belt reel 32, the drive belt 33 and the belt reel 34, the retraction force K admittedly increases with increasing pull-out of the safety belt 17 in accordance with the increasing resetting force of the spring arrangement 16 so that the comfort ensured by the tapering thread reel 12, 14 is no longer achieved, however, the full safety of the belted-up person is still ensured because the safety belt 17 also tensions adequately after it has been put on.

It is to be emphasised that the drive of the belt reel 11 via the clutch 31, the drive belt pulleys 32, 34 and the drive belt 33 only represents an emergency measure and the driver is caused, by lighting-up of the warning lamp 44 on breakage of the thread, that the whole defect belt reeler should be replaced with a fully operational one.

Figure 5:
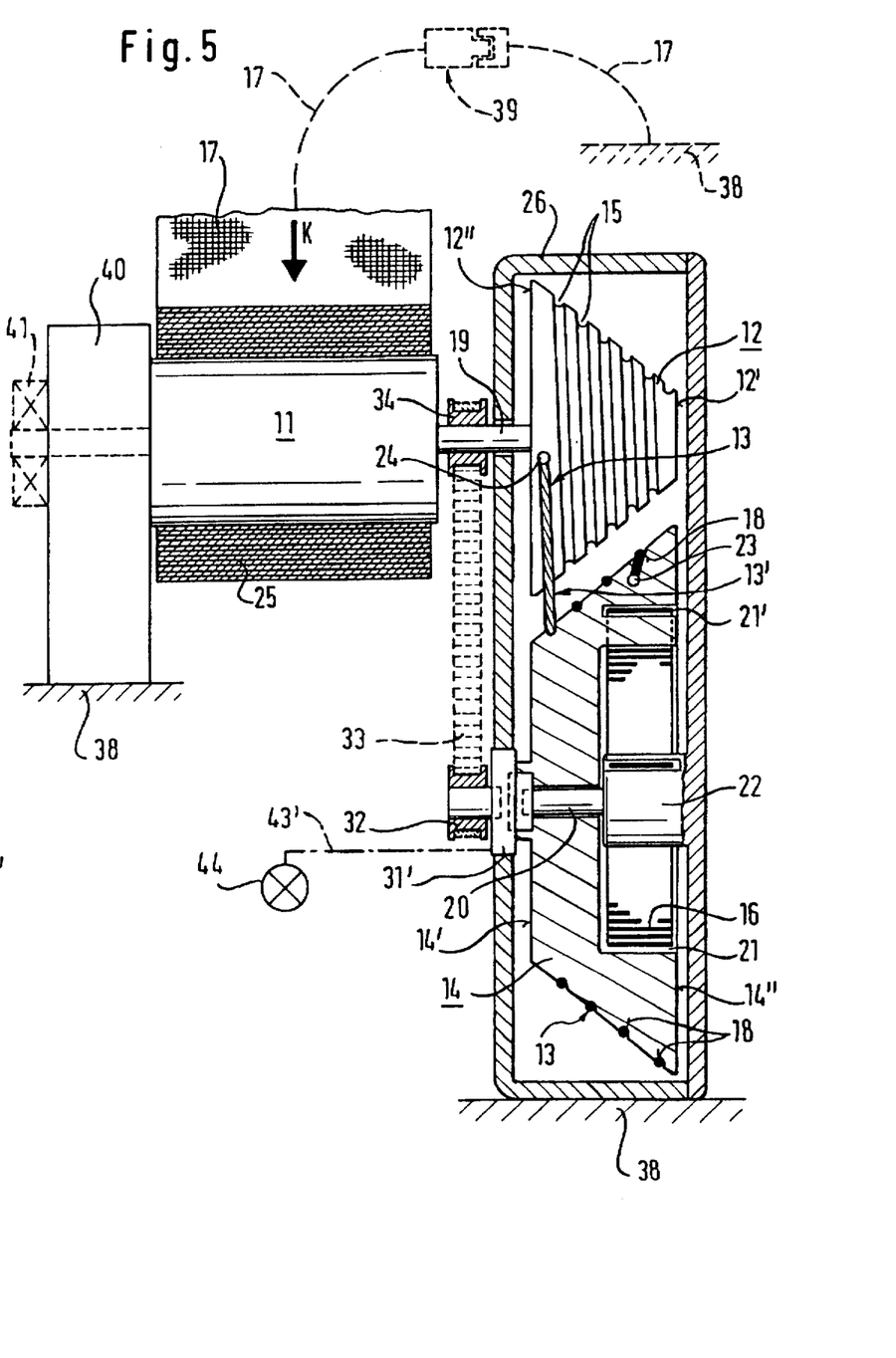

When the clutch 31 is replaced by a centrifugal clutch 31' in accordance with a further embodiment of the invention as shown in FIG. 5, then the provision of a special thread break detector 27 can be omitted because on breakage of the thread the rotary speed of the second thread reel 14 increases substantially so that the centrifugal clutch 31 engages and the rotary movement of the thread reel 14 can now be transmitted via the drive belt pulleys 32, 34 and the drive belt 33 to the belt reel 11.

Figure 6:
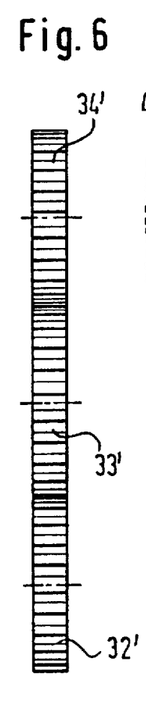

In order to be able to warn the driver in this case as well, the centrifugal clutch 31' can be connected via a control line 43' to the warning lamp 44 and cause this to light up when the clutch engages. In the presence of the clutch 31 (FIG. 4) or of the centrifugal clutch 31' (FIG. 5) the transmission formed by the drive belt pulleys 32, 34 and the drive belt 33 can also be replaced by a gear transmission indicated in FIG. 6 consisting of gear wheels 32', 33', 34', with the gear wheel 32' being arranged coaxial to the thread reel 14 and rotationally fixedly connected to it, whereas the gear wheel 33' is freely rotationally journalled at the housing 26. The gear wheel 34' is in turn rotationally fixedly arranged on the rotary shaft 19. When the clutch 31 or 31' engages, the gear wheel 32' is rotationally fixedly connected to the thread reel 14 and thus generates, via the freely rotating gear wheel 33', a rotary movement at the gear wheel 34' in the same direction and thus a rotary movement of the belt reel 11.

Figures 7, 8:
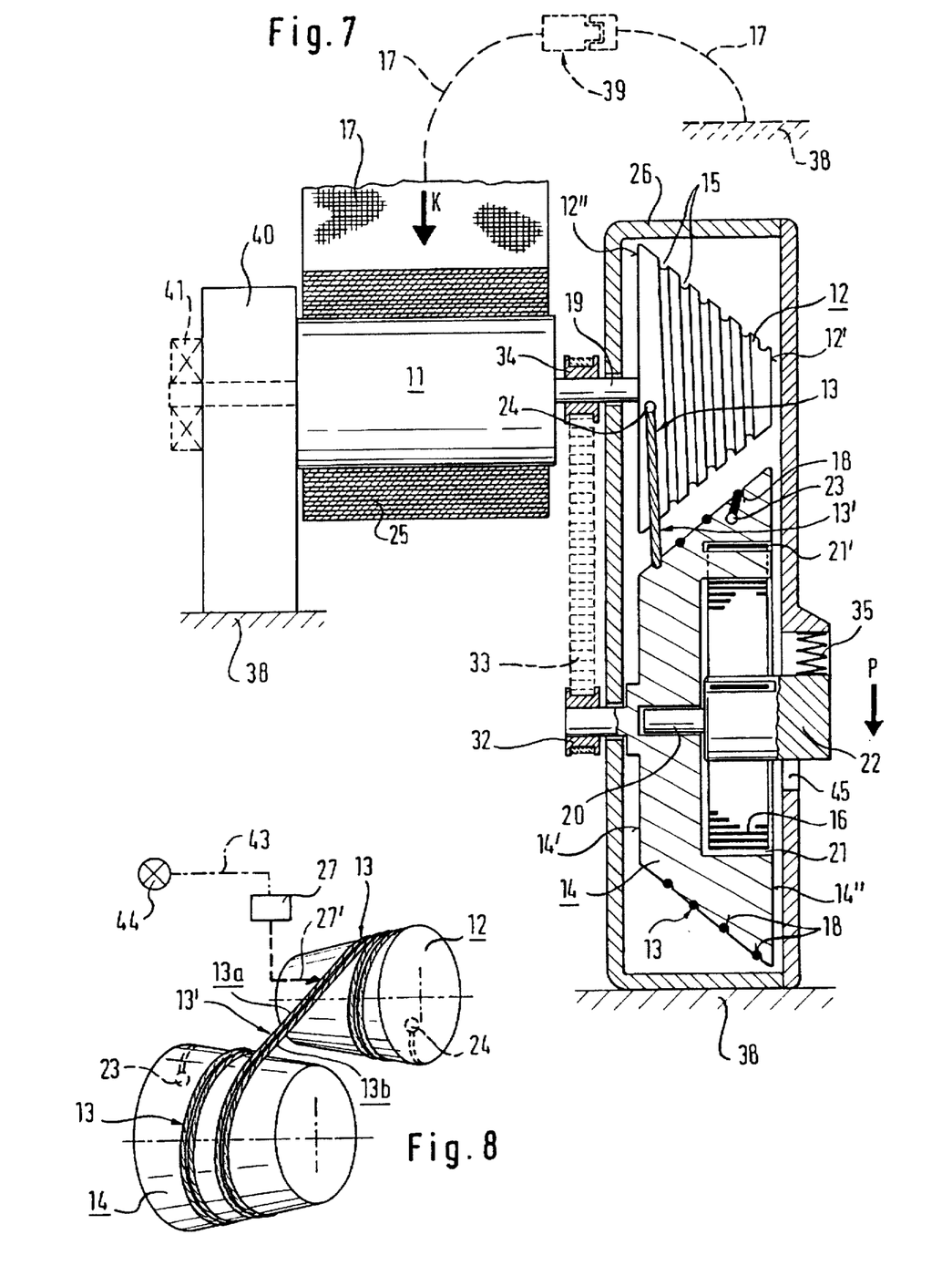

As shown in FIG. 7, it is also possible to dispense with the thread break detector 27 when, in accordance with a further embodiment, the bearing spigot 22 for the second thread reel 14 is journalled so that it is displaceably guided at the housing 26 in the direction of the arrow P, with a compression spring 35 biasing the journalled spigot 22 in the direction of the arrow P. The movement of the bearing spigot 22 in the direction of the arrow P is normally restricted by the intact thread 13.

If the thread 13 breaks, then the force which restrains the bearing spigot in the position of FIG. 1 is missing so that the spring 35 can now displace the bearing spigot 22 in the direction of the arrow P by a certain amount for which a corresponding clearance space 45 is provided in the housing 26.

In the above described embodiment, the second thread reel 14 is furthermore rotationally fixedly connected to the drive pulley 32 while dispensing with the clutch 31 of FIG. 4. In the normal position, when the thread is in order, the drive belt 33 lies so loosely on the drive belt pulleys 32, 34 that on rotation of the thread reel 14 the rotary drive forces are exclusively transmitted by the thread 13 and not via the belt reels 32, 34 and the drive belt 33 to the belt reel 11.

If, however, the thread 13 ruptures and if the bearing spigot 22 is displaced on the action of the spring 35 in the direction of the arrow P into the clearance space 45, then, as a result of a corresponding mounting of the belt reel 32 so that it is displaceable in the direction of the arrow P, the drive belt 33 is tensioned and the drive force of the thread reel 14 is now transmitted via the drive belt 33 to the belt reel 11.

A further particularly simple alternative for maintaining the function on thread breakage can be found in FIG. 8 where the draw member 13 is realised by two partial draw members 13a, 13b which are arranged parallel to one another on the thread reels 12, 14. If one of the partial draw members 13a, 13b breaks, then the other is still available to maintain the function of the reeler.

In this embodiment a thread break detector 27' should be provided which detects the breakage of one of the part threads 13a, 13b which can deliver a corresponding warning signal via the control line 43 to the warning lamp 44 or to an acoustic alarm device.

The belt reeler of the invention is accordingly suitable for executing a series of measures in order to ensure at least a restricted functioning of the safety belt arrangement in the event of thread breakage.

What is claimed is:

1. Spring-driven reeler for safety belts in motor vehicles comprising a belt reel which is blockable against rotation in a draw-out direction by a releasable draw-out blocking device triggerable by accident-dependent accelerations, and/or by an attempted rapid draw-out of the safety belt, the belt reel being rotationally fixedly connected to a first draw member reel which tapers in an axial direction and has a helically shaped guide groove on its periphery, said first draw member reel being rotationally fixedly connected to a further, second draw member reel via a flexible draw member secured at one end to said first draw member reel and wound, contrary to the winding sense of the safety belt on the belt reel, into the guide groove, wherein said second draw member reel tapers in the opposite axial direction to the first draw member reel and is disposed parallel to it and in lateral alignment with it, wherein said second draw member reel has a helical guide groove to which the other end of said draw member is secured, wherein said draw member is wound into the guide groove of the second draw member reel and wherein said second draw member reel is biased in the winding-up direction of the draw member onto the second draw member reel and of the safety belt onto the belt reel, with the two guide grooves being so designed and arranged on the draw member reels that the tensioned draw member piece connecting the two draw member reels merges in a substantially kink-free manner into two draw member turns located on the draw member reels, with the draw member being a thread and the draw member reels being thread reels wherein means active on breakage of the draw member are provided which, on breakage of the draw member, at least prevent a further unwinding of the safety belt from the belt reel and can ensure that a torque for the winding-up of the safety belt is still available at the belt reel.

2. A reeler in accordance with claim 1, wherein the means active on breakage of the draw member have a draw member break detector, transmission means and coupling means which are normally disengaged from each other, but engagable by the draw member break detector which, on detection of the draw member breakage, so couple the second draw member reel to the first draw member reel or to the belt reel so that the first draw member reel is rotationally driven in the belt winding direction by the second draw member reel biased in the winding-up direction.

3. A reeler in accordance with claim 2, wherein the draw member break detector is connected via a control line to a controllable clutch which is inserted between the second draw member reel and the transmission means and is normal disengaged and is also engaged on thread member breakage by the thread member break detector.

4. A reeler in accordance with claim 2, wherein the transmission means is designed as a belt transmission or as a gear transmission.

5. A reeler in accordance with claim 2, wherein the second draw member reel is displaceable relative to the first draw member reel in the draw member tensioning direction from a position where the draw member is tensioned into a position where the transmission means couples the first draw member reel and the second draw member reel in the draw member tensioning direction.

6. A reeler in accordance with claim 5, wherein the displaceable second draw member reel is biased by spring means in the draw member tensioning direction.

7. A reeler in accordance with claim 2 wherein the draw member break detector responds directly to the presence or to the tension of the draw member.

8. A reeler in accordance with claim 7, wherein the draw member break detector has a draw member sensor.

9. A reeler in accordance with claim 2 wherein the draw member break detector responds to the rotational speed of the second draw member reel relative to the first draw member reel.

10. A feeler in accordance with claim 2, wherein the draw member break detector is formed by a centrifugal clutch which stands in rotary connection with the second draw member reel and, on detecting a draw member breakage through a suddenly increasing rotational speed of the second draw member reel, so couples the second draw member reel with the first draw member reel or with the belt reel so that the first draw member reel or the belt reel is rotationally driven in the belt reeling-up direction by the second draw member reel biased in the winding up direction.

11. A reeler in accordance with claim 1, wherein an auxiliary spring arrangement acts on the first draw member reel in the belt winding-up direction and only makes available a fraction of the winding force jointly made available by spring arrangement for biasing the second draw member reel in the belt winding up direction and by the auxiliary spring arrangement.

12. A reeler in accordance with claim 11, wherein the conicity and pitch of the guide groove of the first and second draw member reels are so selected that, based on the spring characteristic of the auxiliary spring arrangement, to achieve one of a desired constant or consciously graduated total winding spring force characteristic.

13. A reeler in accordance with claim 11 wherein the auxiliary spring arrangement makes available 5 to 40% of the total winding force.

14. A feeler in accordance with claim 1, wherein when the draw member breaks the belt draw-out blocking device is engaged.

15. A reeler in accordance with claim 14, wherein a draw member break detector is connected via a control line to the belt draw-out blocking device in order to trigger the latter on breakage of the draw member.

16. A reeler in accordance with claim 1, comprising a belt tensioner arranged at a belt reel which, in the event of an accident-dependent vehicle acceleration, abruptly rolls in the belt reel at least by an amount necessary for belt tensioning, wherein the belt tensioner is initiated on draw member breakage.

17. A reeler in accordance with claim 16, wherein a draw member break detector is connected via a control line to the belt tensioner in order to trigger the latter on draw member breakage.

18. A reeler in accordance with claim 1, wherein the draw member is subdivided into a plurality of partial draw members including two partial draw members extending parallel to one another.

* * * * *

UNITED STATES PATENT AND TRADEMARK OFFICE
CERTIFICATE OF CORRECTION

PATENT NO. : 5,730,385
DATED : March 24, 1998
INVENTOR(S) : Robert Kopetzky et al.

It is certified that error appears in the above-indentified patent and that said Letters Patent is hereby corrected as shown below:

Claim 3, column 7, line 36, change "normal" to --normally--.
Claim 10, column 8, line 7, change "feeler" to --reeler--.

Claim 14, column 8, line 33, change "feeler" to --reeler--.

Signed and Sealed this

Fourth Day of August, 1998

Attest:

BRUCE LEHMAN

Attesting Officer        Commissioner of Patents and Trademarks